(12) United States Patent
Dewa et al.

(10) Patent No.: US 6,425,040 B1
(45) Date of Patent: Jul. 23, 2002

(54) LAN DOCKER UNLOCKING SYSTEM

(75) Inventors: Koichi Dewa; Toru Hanada; Makoto Kosaka, all of Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/324,547

(22) Filed: Jun. 2, 1999

(30) Foreign Application Priority Data

Jun. 3, 1998 (JP) ............................................ 10-154631
Jun. 3, 1998 (JP) ............................................ 10-154640

(51) Int. Cl.[7] ............................................. G06F 13/00
(52) U.S. Cl. ........................ 710/303; 361/726; 713/300
(58) Field of Search ................................. 710/303, 304; 713/300, 310, 340; 361/726, 732

(56) References Cited

U.S. PATENT DOCUMENTS

| 5,394,552 A | | 2/1995 | Shirota | |
|---|---|---|---|---|
| 5,463,742 A | | 10/1995 | Kobayashi | |
| 5,652,892 A | | 7/1997 | Ugajin | |
| 5,911,777 A | * | 6/1999 | Heredia | 710/303 |
| 5,930,110 A | * | 7/1999 | Nishigaki et al. | 710/304 |
| RE36,381 E | * | 11/1999 | Boyle et al. | 710/304 |
| 5,991,839 A | * | 11/1999 | Ninomiya | 710/303 |
| 6,119,184 A | * | 9/2000 | Takahama | 710/303 |
| 6,119,237 A | * | 9/2000 | Cho | 710/303 |
| 6,209,105 B1 | * | 3/2001 | Hamamoto | 710/303 |

FOREIGN PATENT DOCUMENTS

| JP | 6-289955 | 10/1994 |
|---|---|---|
| JP | 7-219666 | 8/1995 |
| JP | 7-244542 | 9/1995 |
| JP | 8-6679 | 1/1996 |
| JP | 9-114566 | 5/1997 |

* cited by examiner

*Primary Examiner*—Glenn A. Auve
(74) *Attorney, Agent, or Firm*—Finnegan, Henderson, Farabow, Garrett & Dunner, L.L.P.

(57) ABSTRACT

When a PC main body wakes up, docking condition discrimination for checking if a LAN controller can be used is made. If the docking condition is satisfied, the LAN controller is set in an operative state, and the PC main body is used while being locked by a lock mechanism. When the WOL function is enabled, a signal WOLEN is activated. In this state, even when the PC main body goes to a sleep state and a signal DOCPWON is turned off, the LAN controller is kept powered. In this case, since the lock mechanism is unlocked, the user can immediately detach the PC main body from a LAN docker and can carry it to a location of his or her choice.

19 Claims, 7 Drawing Sheets

F I G. 1

| DOCPWON | WOLEN | LAN CONTROLLER POWER SUPPLY | LOCK/UNLOCK |
|---------|---------|---|---|
| ENABLE | ENABLE | ON | LOCK |
| ENABLE | DISABLE | ON | LOCK |
| DISABLE | ENABLE | ON | UNLOCK |
| DISABLE | DISABLE | OFF | UNLOCK |

FIG. 2

|    | S0 | S1~S5 |
|----|------|--------|
| D0 | LOCK |        |
| D3 | LOCK | UNLOCK |

LAN DOCKER UNLOCKING SYSTEM

BACKGROUND OF THE INVENTION

This application is based on Japanese Patent Application No. 10-154640, filed Jun. 3, 1998, and on Japanese Patent Application No. 10-154631, filed Jun. 3, 1998, the contents of which are incorporated herein by reference.

The present invention relates to a computer system and lock control method and, more particularly, to a computer system for connecting a network using an expansion unit with a built-in network controller, and a lock control method for locking/unlocking the computer system to/from the expansion unit.

In recent years, various kinds of notebook type personal computers (note PCs) that are easy to carry and can be battery-driven have been developed. Such note PC can be attached on an expansion unit called a docking station or docking base, as needed, so as to expand its functions.

Normally, the expansion unit has a lock mechanism for locking the note PC to the expansion unit to inhibit the former from being detached from the latter. The conventional lock mechanism works when the note PC is attached on the expansion unit, and cannot unlock the note PC unless undocking is done in a predetermined procedure, e.g., by password input, special operation using a key, or the like. For this reason, once the note PC is attached on the expansion unit and begins to be used, it cannot be detached from the expansion unit unless undocking is done in a predetermined procedure, e.g., by password input, special operation using a key, or the like. Hence, the degree of freedom in attachment/detachment and portability of the note PC are considerably impaired.

Recently, IBM Japan has released desktop PCs having functions called "Wake_on_LAN (WOL)" for turning on desktop PCs under the remote control from a server, and "Alert_on_LAN (AOL)" for automatically informing the server of abnormality of each desktop PC.

In case of a note PC, it is preferable that a LAN controller be accommodated not in the PC main body but in an expansion unit called a docking station or docking base, and that expansion unit be permanently connected to a LAN in an office. In this way, when the note PC is docked with the expansion unit in the office, it can be used as a desktop PC. On the other hand, when the user leaves the office, he or she can detach the note PC from the expansion unit and can carry it.

However, in such note PC which comprises a LAN controller with the AOL/WOL function on the expansion unit side, even when the note PC is attached on the expansion unit, the LAN controller is often not used by the note PC in practice.

More specifically, since the AOL/WOL function is implemented based on TCP/IP, an IP address is used for specifying each PC. In case of the not e PC which has the LAN controller on the expansion unit side, since the IP address is stored in the expansion unit side, the combination of the note PC and expansion unit is fixed to use the AOL/WOL function, and if that combination is not satisfied, the note PC must be inhibited from using the LAN controller. When the AOL/WOL function is used, even when the power switch of the note PC is turned off, the LAN controller must be kept ON for the AOL/WOL function.

Hence, when the aforementioned lock mechanism is directly used, once the note PC is connected to the expansion unit, even when the LAN controller is inhibited from being used, the note PC cannot be detached from the expansion unit unless undocking is done in a predetermined procedure, e.g., by password input, special operation using a key, or the like. On the other hand, when the power supply of the PC is turned off, and the LAN controller can no longer be used from the note PC, the note PC cannot be detached from the expansion unit unless undocking is done in a predetermined procedure.

To achieve multi-functions in a system arrangement using this expansion unit, a required function module is to be arbitrarily continuously operative as needed independently of the power ON/OFF state of the docked (attached) computer main body or even when the computer main body is undocked (detached). However, a conventional system of this type cannot implement a function that can meet such requirement.

In either system arrangement, when the computer main body (PC main body) is detached (undocked) from the expansion unit, the operation power (INT-PS) cannot be supplied to the internal circuits of the expansion unit. Also, when the power supply of the computer main body attached (docked) on the expansion unit is OFF, the operation power cannot be supplied to the internal circuits. Hence, the conventional system using the expansion units cannot realize a network system with the above-mentioned wake-up and alert functions.

BRIEF SUMMARY OF THE INVENTION

It is an object of the present invention to provide a computer system and lock control method, which can dynamically control the locked/unlocked state of a lock mechanism in accordance with the state of a LAN controller, and can implement lock control with a high degree of freedom in attachment/detachment while maintaining sufficiently high operation reliability.

It is another object of the present invention to provide a computer system using an expansion unit, which can continuously operate an arbitrary function module in the expansion unit as needed independently of the power ON/OFF state of a computer main body attached on the expansion unit or even when the computer main body is detached from the expansion unit, thereby easily realizing a network system with wake-up and alert functions on the system using the expansion unit.

In order to achieve the above objects, according to the present invention, a computer system removably docking with an expansion unit, comprises: state detecting means for detecting whether or not the use of the expansion unit by the computer system is in an enable state; and lock control means for locking, during the enable state of the use of the expansion unit, the computer system in the expansion unit in order to inhibit the computer system from being removed from the expansion unit.

In this computer system, the lock/unlock state of a lock mechanism is dynamically controlled depending on whether or not the use of the expansion unit by the computer system is possible. While the expansion unit can be used by the computer system attached on that expansion unit, the computer system main body is locked to the expansion unit and is inhibited from being detached therefrom, since accidental detachment may lead to operation errors. While the expansion unit cannot be used by the computer system, the computer system main body is unlocked, and can be detached without requiring any special operation. Hence, lock control with a high degree of freedom in attachment/detachment can be attained while maintaining sufficiently high operation reliability.

The state detecting means is characterized by including docking condition detecting means for detecting whether or not the computer system docked with the expansion unit satisfies a predetermined docking condition for using the expansion unit, and the computer system is locked in the expansion unit while the computer system is in an operative state and the docking condition is satisfied.

With this arrangement, only when the docking condition is satisfied and the computer system is operative, the computer system main body is locked to the expansion unit. When the power supply of the computer system is turned off in this state, the computer system main body is unlocked, and can be immediately detached from the expansion unit.

According to a second aspect of the present invention, a lock control method for use in a computer system removably docked to an expansion unit, comprises the steps of: detecting whether or not the use of the expansion unit by the computer system is in an enable state; and locking, during the enable state of the use of the expansion unit, the computer system in the from being removed from the expansion unit.

According to a third aspect of the present invention, an expansion unit to which a computer system is removably dockable, comprises: a lock mechanism for locking, in the expansion unit, the computer system docked to the expansion unit; and means for receiving a first control signal for powering on and off the expansion unit in cooperation with the transition of the computer system docked to the expansion unit into an operative state, a stop state, and a sleep state, and controlling lock/unlock operation of the lock mechanism in accordance with the first control signal.

Since the network control unit has a plurality of states determined depending on the combinations of the ON/OFF state of a switch that connects/disconnects the bus of the computer system to/from the network control unit, and the power supply state to the network control unit, it preferably manages these states to control locking/unlocking in cooperation with the state of the network control unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The preferred embodiments of the present invention will be described hereinafter with reference to the accompanying drawings.

Figure 1:
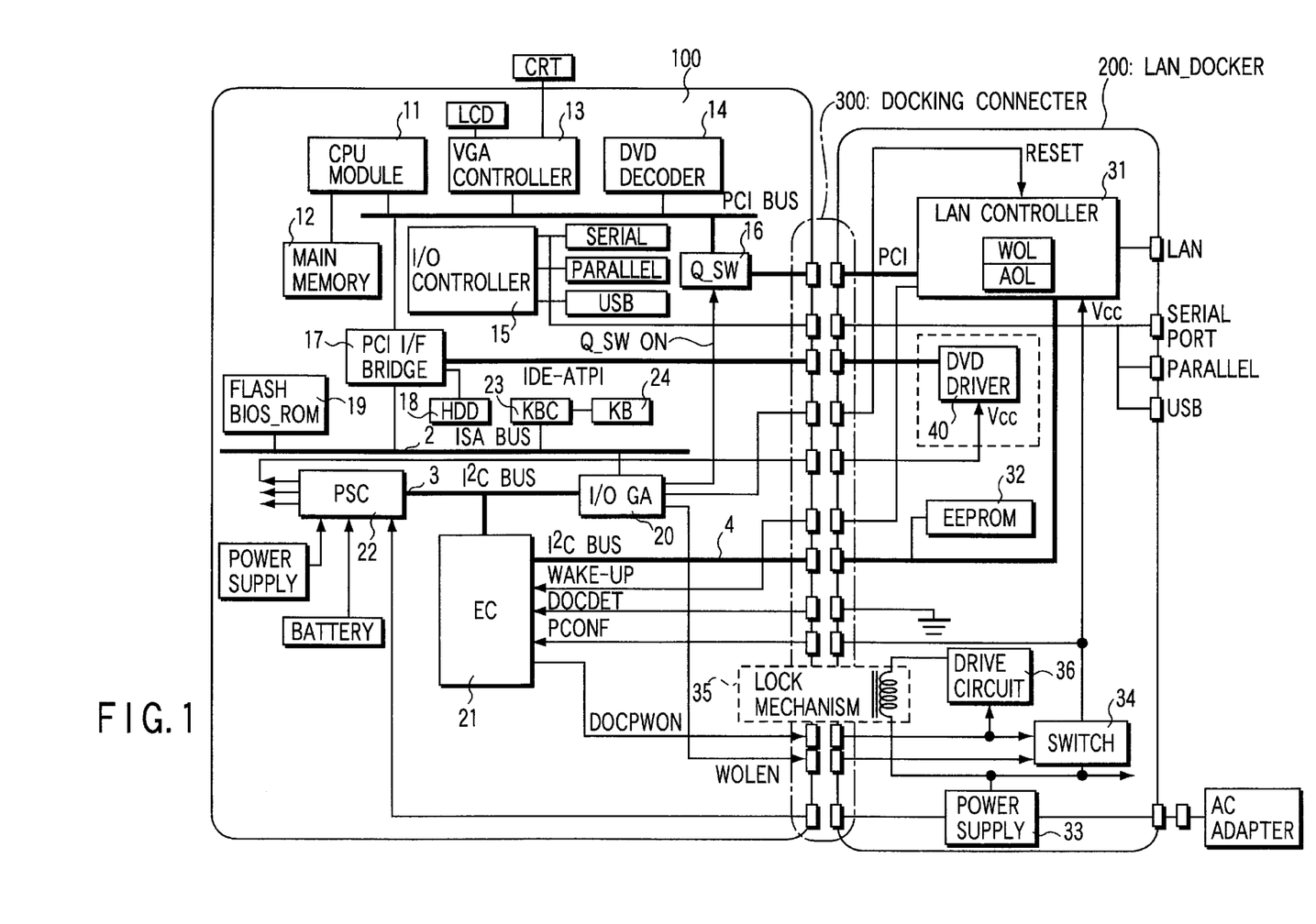
FIG. 1 is a block diagram showing the arrangement of a PC and LAN docker according to the first embodiment of the present invention.

FIG. 1 shows the arrangement of a computer system according to an embodiment of the present invention. This computer system is a notebook type personal computer (to be abbreviated as a PC hereinafter) that can be battery-driven, and its PC main body 100 is free to be attached/detached to/from a LAN docker (LAN_Docker) 200 which serves as an expansion unit for expanding functions. The PC main body 100 and LAN docker 200 are connected via docking connectors 300 provided to them.

The LAN docker 200 includes a LAN controller 31 which communicates with other PCs and a server via a LAN. The LAN controller 31 is compatible with the above-mentioned Wake_on_LAN (WOL) and Alert_on_LAN (AOL) functions. When the WOL function is enabled, the LAN controller 31 generates a wake-up signal Wake_up for automatically turning on the PC main body 100 upon receiving a specific packet from the server via the LAN. When the AOL function is enabled, the LAN controller 31 automatically informs the server of abnormality of the PC main body 100 and status change such as docking/undocking between the PC main body 100 and LAN docker 200 or the like via the LAN.

The LAN docker 200 with the built-in LAN controller 31 is placed on the desk of each employee in, e.g., an office, and is used while it is permanently connected to a LAN cable in the office. Since the LAN controller 31 consumes relatively large power, an AC adapter is used as its operation power supply.

The PC main body 100 is normally used as it is connected to the LAN docker 200 in the office, and is also used outside the office as it is detached from the LAN docker 200. When the PC main body 100 is detached from the LAN docker 200, it operates on its built-in batteries or an external power supplied via an AC adapter. On the other hand, when the PC main body 100 is connected to the LAN docker 200, it operates on its built-in batteries or an AC adapter power supplied from the LAN docker 200.

The PC main body 100 includes a PCI bus 1, ISA bus 2, two I²C buses 3 and 4, CPU module 11, main memory 12, VGA controller 13, DVD decoder 14, I/O controller 15, Q switch (Q-SW) 16, PCI interface bridge (PCI I/F) 17, HDD 18, flash BIOS-ROM 19, I/O control gate array (I/O GA) 20, embedded controller (EC) 21, power supply controller (PSC) 22, keyboard controller (KBC) 23, keyboard (KB), and the like, as shown in FIG. 1.

The CPU module 11 executes operation control and data processing of the entire system, and includes a CPU, cache, memory controller for controlling the main memory 12, and the like.

The main memory 12 is used as a main storage of this system, and stores an operating system, an application program to be processed, user data created by the application program, and the like.

The VGA controller 13 controls an LCD or external CRT used as a display monitor of this system.

The I/O controller 15 is a gate array for controlling various I/O devices in the PC main body 100, and controls devices connected to various I/O connectors such as a serial port, parallel port, USB port, and the like provided to the rear surface of the PC main body 100. When the PC main body 100 is connected to the LAN docker 200, signals supplied from the I/O controller 15 to the I/O connectors on the rear surface of the PC main body 100 are passed to those on the rear surface of the LAN docker 200. In this case, the I/O connectors on the rear surface of the PC main body 100 cannot be used since they are covered by the LAN docker 200, but those on the rear surface of the LAN docker 200 can be used instead.

The Q switch (Q-SW) 16 is a switch circuit for connecting/disconnecting the internal PCI bus 1 to/from an external PCI bus of the LAN docker 200, and is ON/OFF-controlled in accordance with a switch control signal Q_SWON from the I/O control gate array (I/O GA) 20. When the Q switch (Q-SW) 16 is turned on, the LAN controller 31 can be used by the PC main body 100.

The PCI interface bridge (PCI I/F) 17 is a gate array implemented by a 1-chip LSI, and includes a bridge function of connecting the PCI bus 1 and ISA bus 2 in two ways, and an IDE controller for controlling the HDD 18. A control line from the IDE controller is also connected to the docking controller 300. When a DVD drive 40 indicated by the broken line in FIG. 1 is mounted on the LAN docker 200, the IDE controller can control that drive.

The flash BIOS-ROM 19 stores a system BIOS, and is comprised of a flash memory that is capable of a program rewrite. The system BIOS systemizes function execution routines for accessing various hardware components in this system, and includes a power management function of setting the system status in an operative state (power ON state), a stop state (power OFF state), or a sleep state (suspend/hibernation state) between these two states, a function of automatically recognizing a change in hardware environment of the system, a management function of the docking condition with the LAN docker 200, a function of controlling locking/unlocking of a lock mechanism 35 provided to the LAN docker 200, and the like.

The management function of the docking condition with the LAN docker 200 is executed to allow use of the above-mentioned WOL/AOL function in a specific combination of a PC main body 100 and LAN docker 200.

More specifically, in this embodiment, when the WOL function of the LAN controller 31 is enabled, unique ID registration is done to register an ID (Dock_ID) unique to the LAN docker 200 in the flash BIOS-ROM 19. Upon generation of a wake-up signal Wake-up from the LAN controller 31, the Dock_ID registered in the flash BIOS-ROM 19 is collated with that of the LAN docker 200, and control as to whether or not the PC main body 100 is set operative is made based on the collation result.

Also, when the PC main body 100 is turned on while it is attached to the LAN docker 200, ID collation is made. When the two IDs do not match, the PC main body 100 resumes its operative state while it is inhibited from using the LAN controller 31; when the two IDS match, or when the combination of the LAN docker 200 and PC main body 100 is not ID-registered with another apparatus, the PC main body is granted use of the LAN controller 31.

The I/O control gate array 20 is a bridge LSI that bridges the internal ISA bus 2 and I$^2$C bus 3, and incorporates a plurality of registers that can be read/written by the CPU module 11. Using these registers, the CPU module 11 can communicate with the power supply controller (PSC) 22 and embedded controller (EC) 21 on the I$^2$C buses 3 and 4.

The embedded controller (EC) 21 manages the power supply state of the PC main body 100 in cooperation with the power supply controller (PSC) 22. The embedded controller (EC) 21 and power supply controller (PSC) 22 are kept supplied with power even when the PC main body 100 is turned off and goes to a sleep or stop state. The embedded controller (EC) 21 has a function of controlling the power supply controller (PSC) 22 in response to detection of a generated power ON/OFF event, a function of informing the system BIOS of the generated power ON/OFF event as a power management event, and the like. The embedded controller (EC) 21 has, as functions of controlling the LAN docker 200, a function of detecting docking/undocking between the PC main body 100 and LAN docker 200, a function of controlling power supply to the LAN docker 200, a function of monitoring a wake-up signal from the LAN controller 31, a function of communicating with the LAN controller 31 via the I$^2$C bus 4, and the like.

Docking/undocking between the PC main body 100 and LAN docker 200 is detected using a dock detect signal DOCDET. The dock detect signal DOCDET indicates the voltage value of a predetermined pin of the docking connector 300, and goes low when the PC main body 100 is connected to the LAN docker 200.

Power supply control of the LAN docker 200 is done using a dock power ON signal DOCPWON and wake-on-LAN enable signal WOLEN.

The dock power ON signal DOCPWON is a power supply ON signal sent from the EC 21 in the PC main body 100 to the LAN docker 200 side. When the dock power ON signal DOCPWON is activated, the power supply of the LAN docker 200 is turned on.

The dock power ON signal DOCPWON is activated when:

1) docking of the PC main body 100 to the LAN docker 200 is detected based on the dock detect signal DOC-DET; or
2) the power supply of the PC main body 100 is turned on in the docking state (including power ON upon operation of the power switch, and power ON in response to the wake-up signal Wake_up).

The dock power ON signal DOCPWON is inactivated when:

1) undocking of the PC main body 100 is detected based on the dock detect signal DOCDET;
2) the power supply of the PC main body 100 is turned off in the docking state; or
3) the system BIOS instructs to turn off the dock power ON signal DOC?WON.

Using this dock power ON signal DOCPWON, the LAN docker 200 can be ON/OFF-controlled in cooperation with docking/undocking and power ON/OFF of the PC main body 100.

The wake-on-LAN enable signal WOLEN determines whether or not the LAN docker 200 is maintained ON, when the dock power ON signal DOCPWON is inactivated upon power OFF of the PC main body 100 or undocking of the PC main body 100, and is sent from the I/O control gate array 20 in the PC main body 100 to the LAN docker 200 side.

When the WOL/AOL function of the LAN controller 31 is enabled, the system BIOS enables the wake-on-LAN enable signal WOLEN. Consequently, the LAN controller 31 is kept supplied with power, and even when the PC main body 100 is turned off and is set in a sleep or stop state, the LAN controller 31 can communicate with the server. After a switch circuit 34 provided to the LAN docker 200 holds an ON state in response to the signal WOLEN, it maintains the ON state even after the signal WOLEN is disabled. Hence, even when the PC main body 100 is turned off after the WOL function is enabled and is detached from the LAN docker 200, power supply to the LAN controller 31 is maintained.

Of these two power supply control signals, the dock power ON signal DOCPWON is also used for controlling locking/unlocking the lock mechanism 35 provided to the LAN docker 200. This controls turns on the LAN controller 31 while the lock mechanism 35 is enabled when the PC main body 100 wakes up to an operative state, and automatically unlocks the lock mechanism when the PC main body 100 shifts from the operative state to the stop or sleep state.

In this manner, since power supply to the LAN controller 31 is controlled using the two different power supply control signals, and locking/unlocking of the lock mechanism 35 is controlled by the dock power ON signal DOCPWON, power is supplied to the LAN controller 31 while keeping the lock mechanism locked when the PC main body 31 is operative, or power is supplied to the LAN controller 31 while keeping the lock mechanism unlocked when the PC main body 100 transits to the stop or sleep state upon power OFF. When the aforementioned docking condition is not satisfied and the use of the LAN controller 31 is inhibited, the dock power ON signal DOCPWON is inactivated by the system BIOS. In this way, works using the PC main body 100 can be made without locking the PC main body 100.

Note that a signal PCONF supplied from the LAN docker 200 side to the EC 21 is used for confirming whether or not the LAN controller 31 is ON.

As the LAN docker 200, a first type docker that mounts the DVD drive 40, and a second type docker that does not mount any DVD drive 40 are available. Either type of LAN dockers 200 includes an EEPROM 32, a power supply circuit 33, a switch circuit 34, an electromagnetic lock mechanism 35, and a drive circuit 36 in addition to a LAN controller 31 as described above.

The EEPROM 32 stores PnP information required for implementing a plug-and-play function such as attribute information of the LAN docker 200, that of the LAN controller 31 built in the LAN docker 200, and the like. The attribute information of the LAN docker 200 includes an ID unique to that LAN docker 200. When the WOL/AOL function is enabled, the unique ID of the LAN docker 200 is read out from the EEPROM 32 by the system BIOS and is saved in the flash BIOS-ROM 19.

The power supply circuit 33 generates an internal power for the LAN docker 200 from an AC adapter power supply. A power for the LAN controller 31 is supplied from the power supply circuit 33 to the LAN controller 31 via the switch circuit 34. The switch circuit 34 is turned on when the signal DOCPWON is active, thus supplying power to the LAN controller 31. When the signal DOCPWON is inactive, the switch circuit 34 is turned off, thus cutting off power supply to the LAN controller 31. Note that the switch circuit 34 includes a state holding circuit, and holds the ON state until the next activation timing of the signal DOCPWON, if the signal WOLEN is active when the signal DOCPWON changes from active to inactive.

The lock mechanism 35 locks the PC main body 100 docked with the LAN docker 200 to prevent it from being ejected from the LAN docker 200. More specifically, the lock mechanism 35 locks the PC main body 100 while a solenoid is being energized by the drive circuit 36. That is, while the solenoid is energized, a button or lever for ejecting the PC main body 100 from the LAN docker 200 is inhibited from operating, and the PC main body 100 cannot be undocked from the LAN docker 200.

The solenoid is energized by the drive circuit 36 during the period in which the PC main body 100 can use the LAN controller 31, i.e., only the period in which the signal DOCPWON is maintained active. This is to prevent operation errors that may take place upon ejecting the PC main body 100 during the use of the LAN controller 31 and to easily eject the PC main body 100 while the LAN controller 31 is not used by the PC main body 100. While the signal DOCPWON is maintained active, an LED lamp is turned on. The ON LED lamp indicates an environment that allows the use of the LAN controller 31. On the other hand, the OFF LED lamp indicates an unlocked state, i.e., a state wherein the PC main body 100 can be safely undocked.

Figure 2:
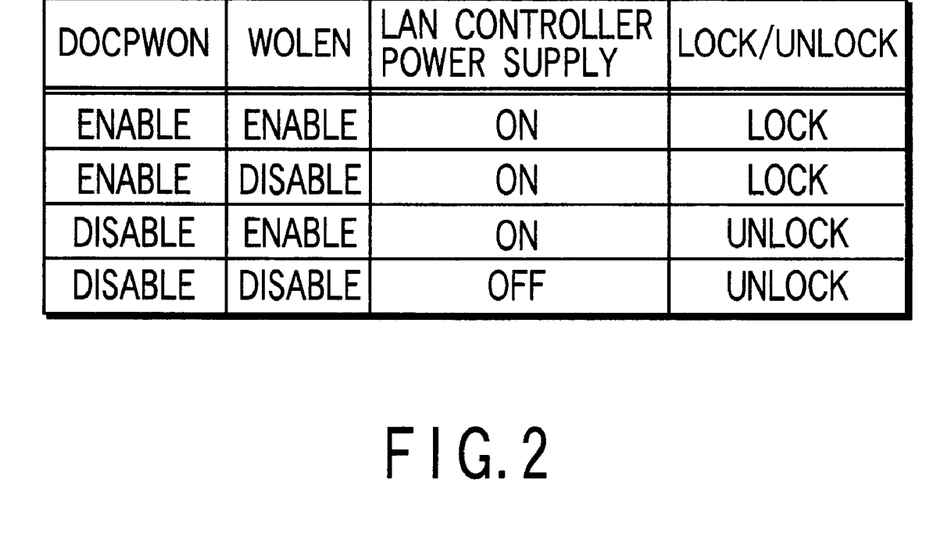
FIG. 2 is a table showing the relationship among the power supply control signals, power supply state of a LAN controller, and lock/unlock state used in the first embodiment.

The relationship among these two power supply control signals DOCPWON and WOLEN, the power supply state of the LAN controller 31, and the lock/unlock state by the lock mechanism 35 is as shown in FIG. 2.

In this LAN docker 200, when the WOL function is enabled, the signal WOLEN is activated. As a result, even when the PC main body 100 enters a sleep state and the signal DOCPWON is inactivated, the LAN controller 31 is kept supplied with power. For example, when the user interrupts an ongoing work in the office and continues that work in another location after he or she brings the PC main body 100 there, such state is set. In this case, since the lock mechanism 35 is unlocked, the user can immediately undock the PC main body 100 from the LAN docker 200 and can carry it.

Figure 3:
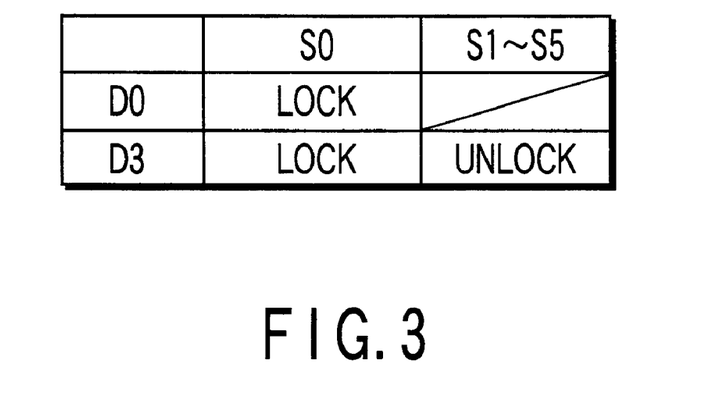
FIG. 3 is a table showing the relationship between the system and device states and lock/unlock states used in the first embodiment.

FIG. 3 shows the relationship among the lock/unlock state by the lock mechanism 35 with the system states (S0 through S5) of the PC main body 100 and the device states (D0, D3) of the LAN controller 31.

Figure 4:
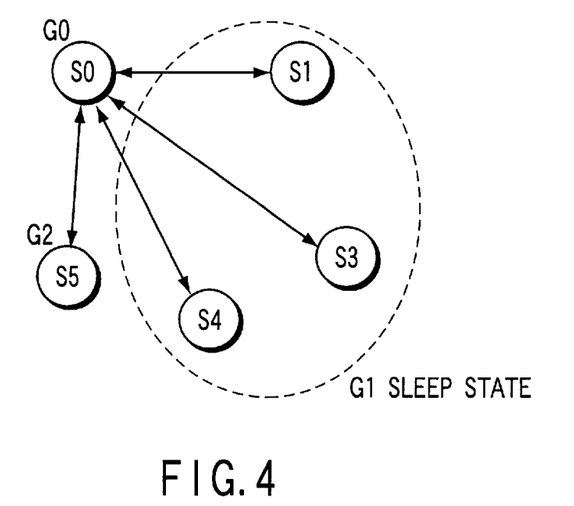
FIG. 4 is a view for explaining the system states used in the first embodiment.

In an ACPI specification for power management, as shown in FIG. 4, system states S0 through S5 are defined: S0 indicates an operative state (i.e., the system is ON and software is running); S5, an OFF state (execution of all software programs has ended and the system power supply is OFF); and S1 to S4, sleep states (operation halts while holding the previous execution state of software) between the two states. The PC main body 100 of this embodiment uses, as the sleep states, a suspend state in which the work state is saved in the memory and most of devices other than the memory are turned off, and a hibernation state in which the work state is saved in the HDD or the like, and most of devices including the memory are turned off.

Although the device states include D0 to D3, as the device states of the LAN controller 31 in this embodiment, D0 in which the LAN controller 31 can be recognized and accessed by software in the PC main body 100, and D3 in which the LAN controller 31 cannot be used by software in the PC main body 100 are assumed.

As can be seen from FIG. 3, when the system state of the LAN controller 31 is D0 and the system state is S0, a lock state is set. On the other hand, even when the device state is D3, if the system state at that time is S0, the lock state is set. That is, only when the LAN controller 31 can be used by the PC main body 100, the lock state is set; otherwise, an unlock state is set.

Figure 5:
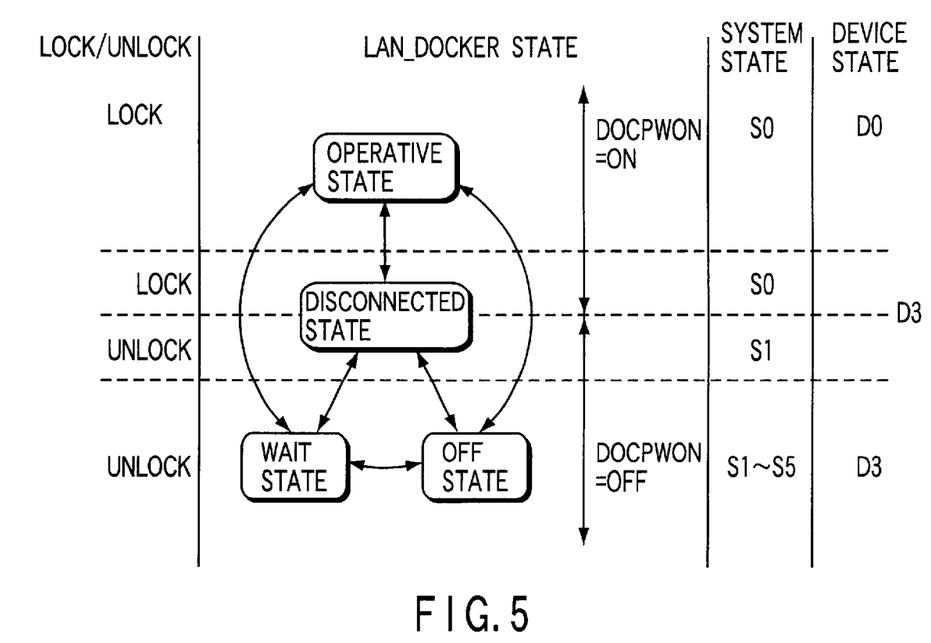
FIG. 5 is a view for explaining state management of the LAN docker in the first embodiment.

State management of the LAN docker 200 used in this embodiment will be explained in detail below with reference to FIG. 5.

In this embodiment, the following four states are defined as those of the LAN docker 200, i.e., the LAN controller 31 mainly with reference to the combination of the ON/OFF state of the Q switch 16 and the power supply state to the LAN controller 31:

1) operative state;
2) disconnected state;
3) wait state; and
4) OFF state.

Figure 6:
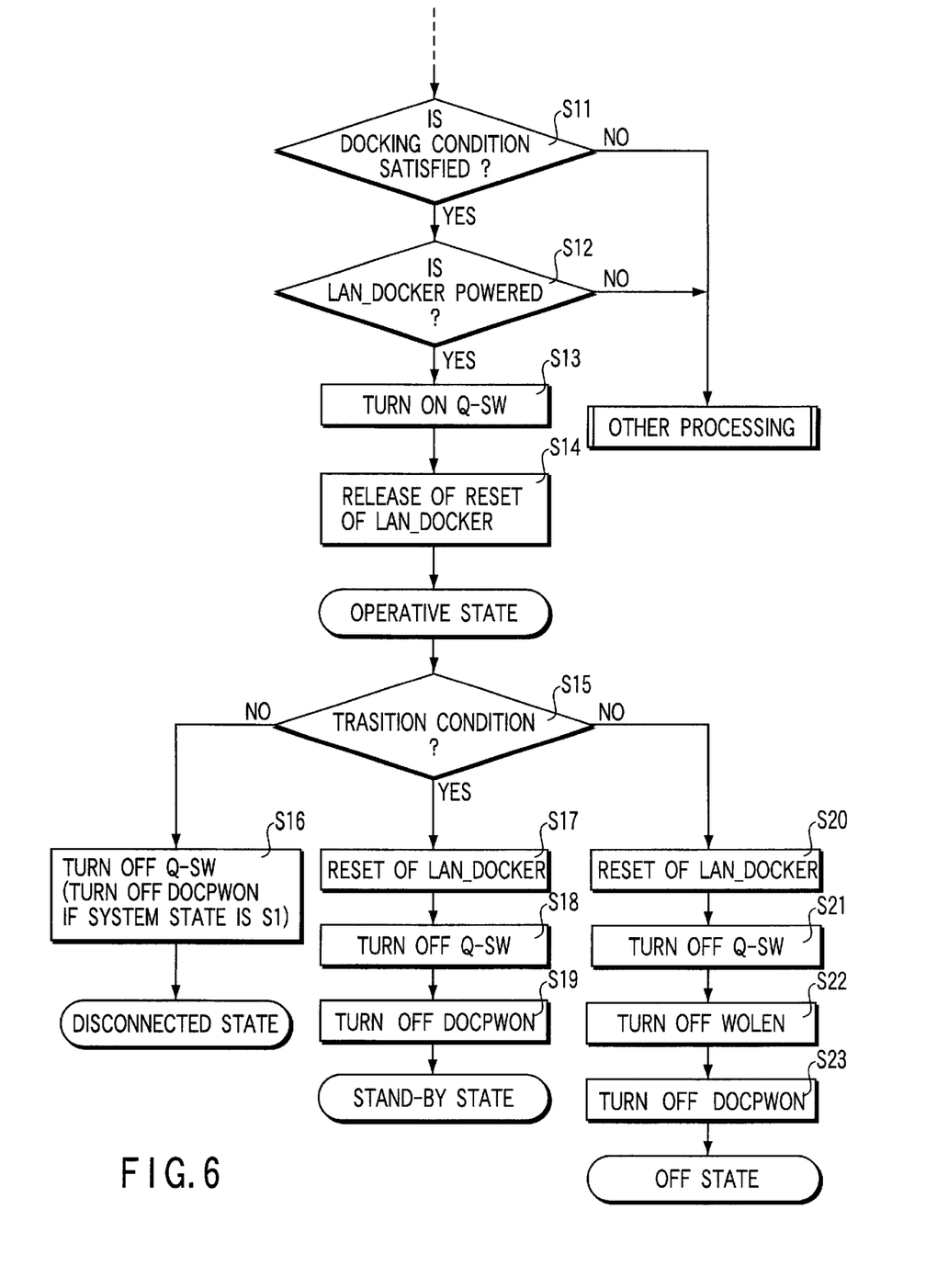
FIG. 6 is a flow chart for explaining the control flow of state transition of the LAN docker in the first embodiment.

These states change in cooperation with transition of the system state or the like under the control of the system BIOS. FIG. 6 roughly shows the flow of the state transition control by the system BIOS.

The above-mentioned four states will be respectively described in detail below with the aid of FIGS. 5 and 6.

1) Operative State

In the operative state, the LAN controller 31 can be used by the PC main body 100. This state is set when the PC main body 100 and LAN docker 200 satisfy the docking condition and the LAN controller 31 is ON (DOCPWON=ON).

The docking condition is satisfied when one of the following requirements is met:

1) a specific combination of the PC main body 100 and LAN docker 200 is confirmed by the aforementioned ID collation;
2) the combination of the PC main body 100 and LAN docker 200 is not ID-registered, and the AOL/WOL functions of both the PC main body 100 and LAN docker 200 are disabled; and
3) the PC main body 100 is started up by a supervisor password.

When the docking condition is not satisfied, the signal DOCPWON is inactivated to inhibit the LAN docker 200 from being used.

In the operative state, the Q switch 16 is turned on, and the reset state of the LAN controller 31 by a reset signal RESET is canceled. Transition to this operative state is made in steps S11 to S14 in FIG. 6.

In the operative state, the system state is S0, and the device state of the LAN controller 31 is D0. Also, the PC main body 100 is locked to the LAN docker 200.

2) Disconnected State

This state is substantially the same as the operative state, except that only the Q switch 16 is OFF. The device state of the LAN controller 31 is D3, and returns to D0 when the Q switch 16 is turned on. Transition from the operative state to the disconnected state is made in steps S15 and S16 in FIG. 6.

At this time, if the system state is Si, since DOCPWON is ON, the PC main body 100 is locked to the LAN docker 200. However, if the system state is S1, DOCPWON is OFF, and the PC main body 100 is unlocked.

3) Wait State

For example, when the WOL function is enabled (WOLEN=ON), the LAN controller 31 is set in this state, and the power supply of the PC main body 100 is turned on (suspend/hibernation/stop). In this case, the LAN docker 200 is reset, the Q switch 16 is turned off, and the power supply of the LAN docker 200 is turned off (DOCPWON= OFF). Transition from the operative state to the wait state is made in steps S17 to S19 in FIG. 6.

In the wait state, the device state of the LAN controller 31 is D3, and the system state is one of S1 to S5. The PC main body 100 is unlocked from the LAN docker 200, and can be detached any time the user wants.

4) OFF State

In the OFF state, power supply to the LAN controller 31 is cut off. In this case, as shown in steps S20 to S23 in FIG. 6, the LAN docker 200 is reset, the Q switch 16 is turned off, the signal WOLEN is turned off, and the power supply of the LAN docker 200 is turned off (DOCPWON=OFF). In the OFF state, the device state of the LAN controller 31 is D3, and the system state is one of S1 to S5. The PC main body 100 is unlocked from the LAN docker 200, and can be detached any time the user wants.

The OFF state is set when the power supply of the PC main body 100 is turned off while the WOL/AOL function is disabled. Even when the power supply of the PC main body 100 is turned on, if the docking condition is not satisfied, the system BIOS turns off DOCPWON, thus turning off the LAN controller 31.

Figure 7:
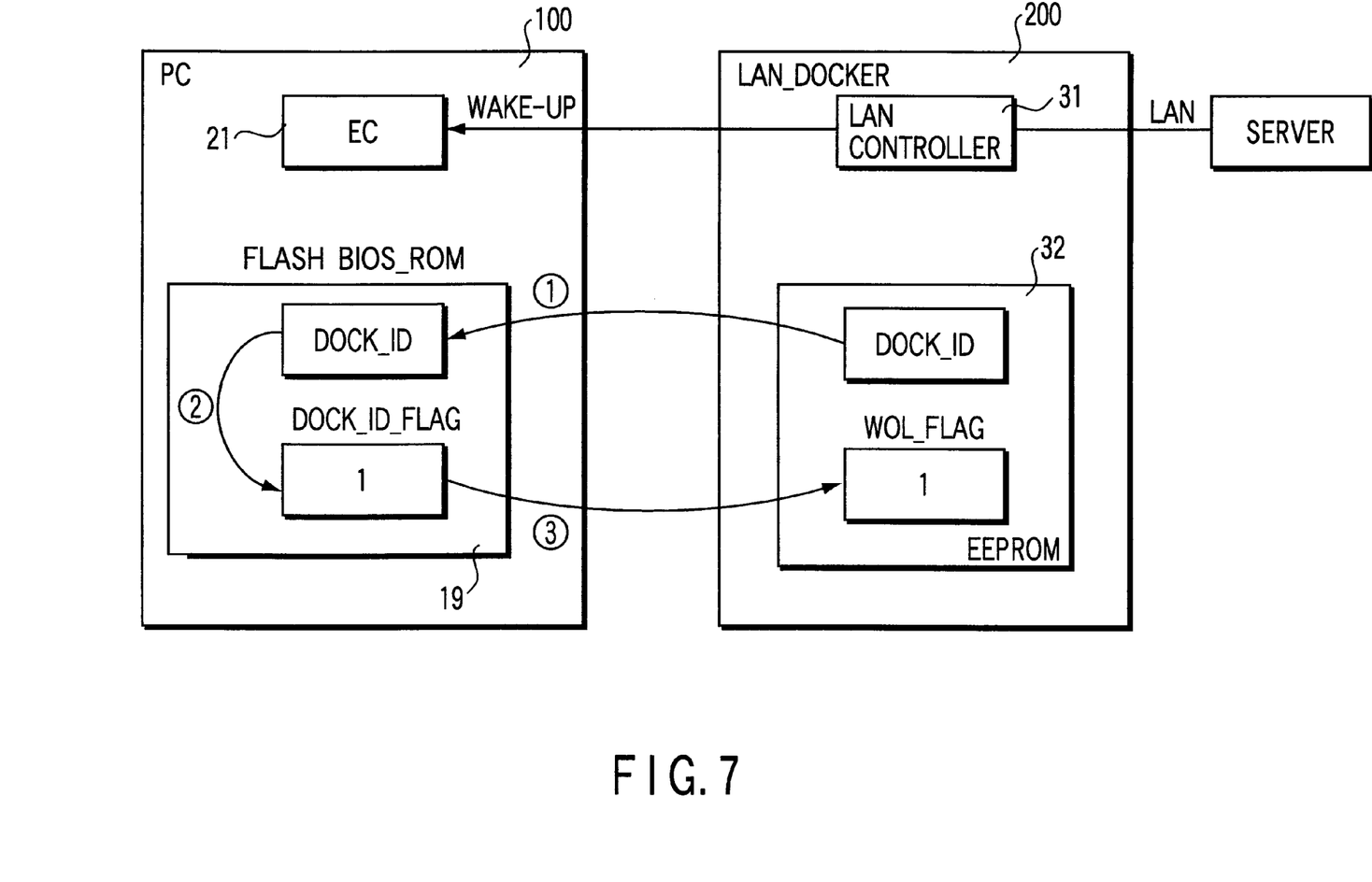
FIG. 7 is a block diagram for explaining the principle of ID collation used in the first embodiment.

The docking management function using ID collation will be explained below with reference to FIG. 7.

When the WOL function of the LAN controller 31 is enabled, the following ID registration is done by the system BIOS in that setup process.

1) The unique ID (Dock_ID) of the LAN docker 200 is read out from the EEPROM 32 of the LAN docker 200, and is registered in the data area of the flash BIOS-ROM 19 of the PC main body 100 as the unique ID of the docking partner. 2) A dock ID flag (Dock_ID_FLAG) prepared in the data area of the flash BIOS-ROM 19 is set at "1". The dock ID flag (Dock_ID_FLAG) indicates whether or not the unique ID of the docking partner has been registered, and Dock_ID_FLAG=1 indicates that the unique ID of the docking partner has been registered, in other words, the PC main body 100 corresponds to the LAN docker 200 to implement the WOL function, and the WOL function of the PC main body 100 is enabled.

After that, 3) a wake-on-LAN flag (WOL_FLAG) held in the EEPROM 32 of the LAN docker 200 is set at "1". The wake-on-LAN flag (WOL_FLAG) indicates whether or not the ID (Dock_ID) unique to the LAN docker 200 has been registered in the PC main body as the docking partner, and WOL_FLAG="1" indicates that Dock_ID has been registered in the PC main body as the docking partner, or the PC main body 100 corresponds to the LAN docker 200 to implement the WOL function, and the WOL function of the LAN docker 200 is enabled.

When the WOL function is enabled, the aforementioned wake-on-LAN enable signal WOLEN is enabled. In this manner, after the power supply of the PC main body 100 is turned off, the LAN controller 31 is kept powered.

Upon receiving a specific packet from the server, the LAN controller 31 issues a wake-up signal Wake_up to the PC main body 100. The EC 21 of the PC main body 100 is kept ON. Upon receiving the wake-up signal Wake_up, the EC 21 informs the power supply controller (PSC) 22 of that signal to make the controller 22 turn on the power supply of the PC main body 100 and begin to supply a minimum required power required for starting up the system BIOS. At the same time, the EC 21 generates a dock power ON signal DOCPWON.

The system BIOS reads out the ID (Dock_ID) unique to the LAN docker 200 from its EEPROM 32 to check if the current combination of the PC main body 100 and LAN docker 200 is an ID-registered one, and compares the readout Dock_ID with Dock_ID registered in the flash BIOS-ROM 19. If the two IDs do not match, the system BIOS turns off the power supply of the PC main body 100, and resets its system status to a state (suspend/hibernation/stop state) before generation of the wake-up signal Wake_up. On the other hand, if the two IDs match, the system BIOS turns on the Q switch 16, executes a resume process from the suspend/hibernation state or starts up the OS, and passes the control to the OS. In this fashion, the PC main body 100 can be accessed from the server via the network using the LAN controller 31.

As described above, in this embodiment, since collation is done using unique IDs, remote control using the WOL function is allowed in only a specific combination of a LAN docker 200 and PC main body 100.

Hence, even when the PC main body 100 is detached from the LAN docker 200 after the WOL function is enabled, a one-to-one relationship between the LAN docker 200 and PC main body 100 can be held, and even when another PC is attached to the LAN docker 200, data in that PC can be prevented from being erroneously updated.

While the PC main body 100 is detached from the LAN docker 00, data or the like from the server are held in the LAN controller 31, and when the PC main body 100 registered with an authentic ID is re-attached to the LAN docker 200, the held data are passed onto the PC main body 100.

Figure 8:
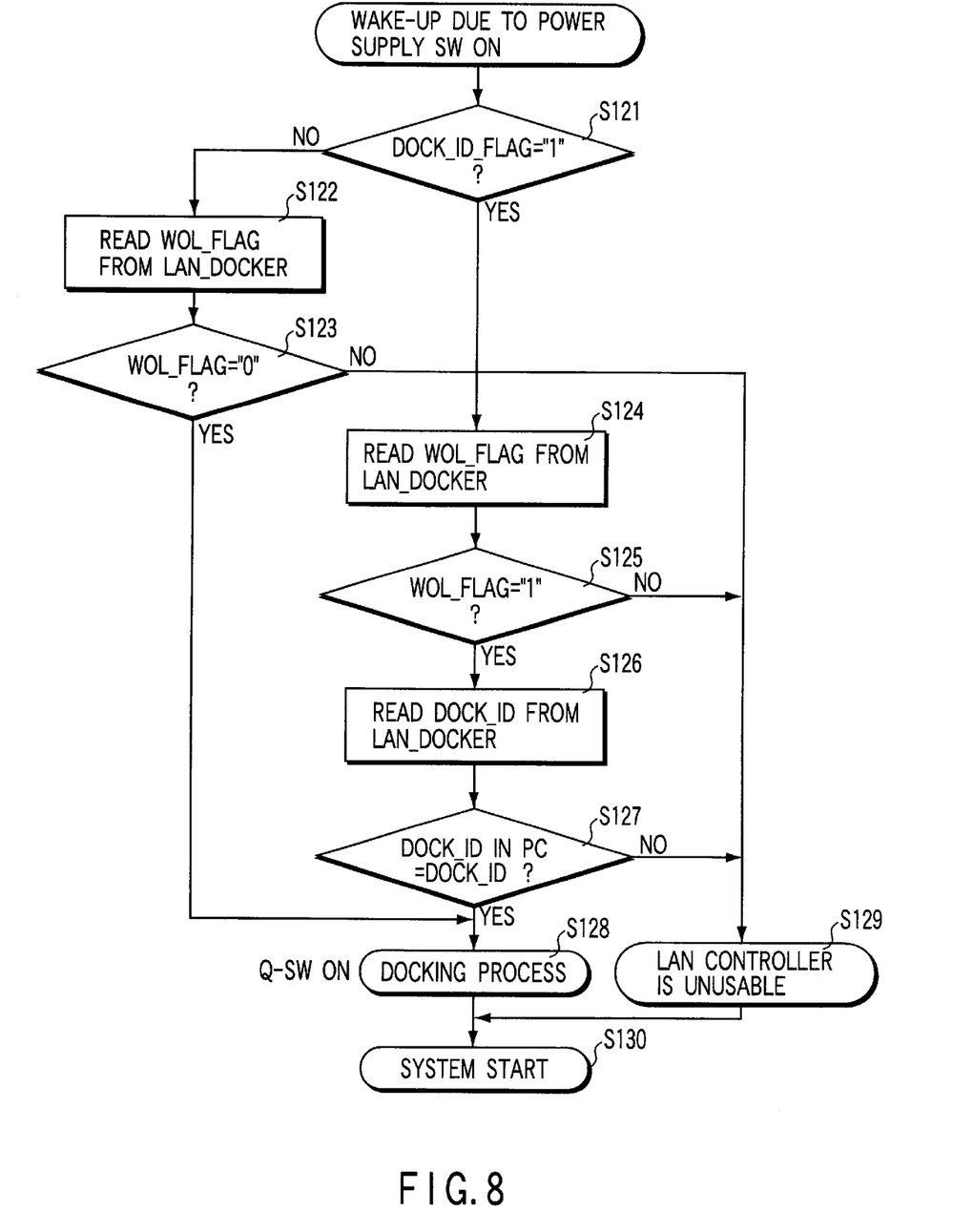
FIG. 8 is a flow chart for explaining the flow of docking condition discrimination executed in the first embodiment.

An example of docking condition discrimination upon power ON will be explained below with reference to FIG. 8.

For example, when the user turns on the power switch of the PC main body 100 or when connection of the PC main body 100 to the LAN docker 200 is detected based on the dock detect signal DOCDET, a dock power ON signal DOCPWON is generated to turn on the power supply of the LAN docker 200, and wake up the PC main body 100 from the current sleep or stop state, thus executing the system BIOS.

The system BIOS refers to the value of the dock 7Z ID flag (Dock_ID_FLAG) in the flash BIOS-ROM 19 to check if the PC main body 100 corresponds to the predetermined LAN docker 200 to enable the WOL function (step S121).

If Dock_ID_FLAG="0", the system BIOS determines that the WOL function of the PC main body 100 is not enabled and does not correspond to any LAN docker. The system BIOS refers, in turn, to the wake-on-LAN flag (WOL_FLAG) of the currently attached LAN docker 200 to check if that LAN docker 200 corresponds to another PC to enable the WOL function (steps S122 and S123). If WOL_FLAG="0", i.e., if the WOL function is not enabled and that LAN docker does not correspond to any PC, the system BIOS determines that the WOL functions of the current combination of the PC main body 100 and LAN docker 200 are not enabled and this combination is not an ID-registered one. Then, the system BIOS starts the above-mentioned docking process including processes for turning on the Q switch 16, canceling the reset state, and the like (step S128), so that the LAN controller 31 can be used. With this process, the LAN controller 31 is set in the operative state. After that, the system BIOS executes a system startup process such as a resume process from the suspend/hibernation state, an OS startup process, or the like to set the system state in the operative state, and passes control to the OS (step S130). The PC main body 100 is used in the locked state.

On the other hand, if WOL_FLAG="1" is detected in step S123, since the LAN docker on which the PC main body 100 is currently attached corresponds to another PC, the system BIOS does not execute the docking process, and executes the system startup process in step S130 while inhibiting the LAN controller 31 from being used, i.e., determining that the PC main body is not docked with any LAN docker (step S129). In this case, since the dock power ON signal DOCPWON is inactivated, the power supply of the LAN controller 31 is turned off, and the Q switch 16 is kept OFF. As a result, the PC main body 100 cannot use the LAN controller 31, but can use the serial port, parallel port, USB port, and DVD drive 40 provided to the LAN docker 200 as usual. The PC main body 100 is used in the unlocked state.

Also, if Dock_ID_FLAG="1" is detected in step S121, the system BIOS refers to the wake-on-LAN flag (WOL_FLAG) of the LAN docker 200 to check if that LAN docker 200 corresponds to some PC to enable the WOL function (steps S124 and S125).

If WOL_FLAG="0", since a LAN docker to which the PC main body 100 corresponds does not match the current LAN docker, the system BIOS does not execute any docking process, and executes the system startup process in step S130 while inhibiting the LAN controller 31 from being used, i.e., determining that the PC main body is not docked with any LAN docker (step S129). In this case, the PC main body 100 is also used in the unlocked state.

On the other hand, if WOL_FLAG="1" is detected in step S125, the system BIOS reads out the ID (Dock_ID) unique to the LAN docker 200 attached to the PC main body 100 from the EEPROM 32 of that LAN docker 200 (step S126), and compares the readout Dock_ID with Dock_ID registered in the flash BIOS-ROM 19 (step S127). If the two IDs match, the system BIOS executes the docking process in step S128, and then executes a system startup process in step S130. In this case, the PC main body 100 is used in the locked state.

On the other hand, if it is detected in step S127 that the two IDs do not match, since the apparatuses correspond to different partners, the system BIOS does not execute any docking process, and executes the system startup process in step S130 while inhibiting the LAN controller 31 from being used, i.e., determining that the PC main body is not docked with any LAN docker (step S129). In this case, the PC main body 100 is used in the unlocked state.

As described above, in this embodiment, control for permitting or inhibiting the PC main body 100 from using the LAN controller 31 is made in correspondence with the discrimination result of the docking condition. Only when the use of the LAN controller 31 is permitted, the PC main body 100 is locked. When the use of the LAN controller 31 is inhibited, the PC main body 100 is unlocked. Even when the use of the LAN controller 31 is permitted, the PC main body 100 is unlocked if its power supply is turned off and the PC main body 100 cannot use the LAN controller 31.

Figure 9:
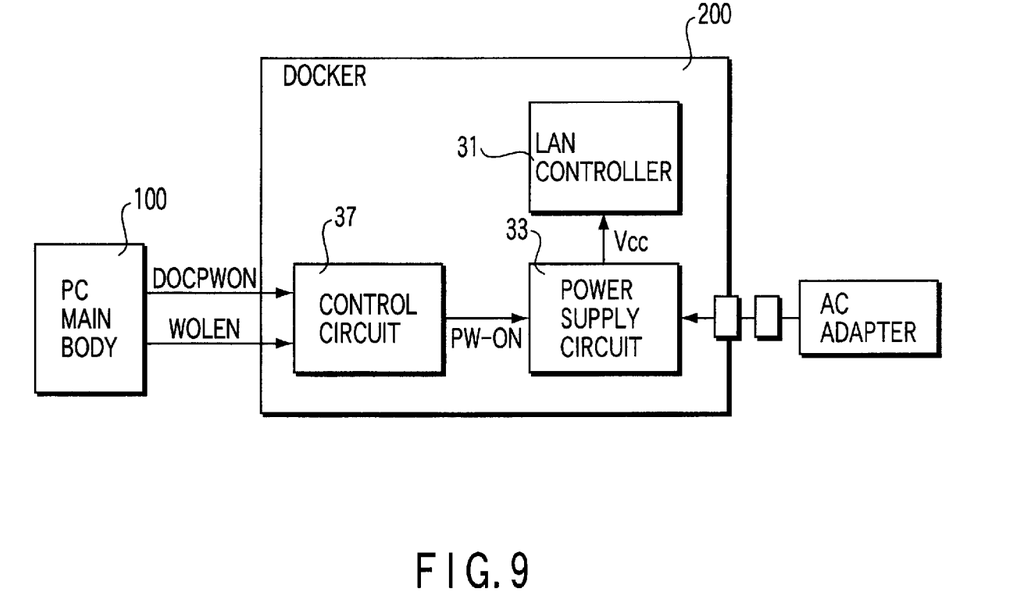
FIG. 9 is a block diagram showing the arrangement of a computer system according to the second embodiment of the present invention.

The second embodiment of the present invention will be explained below with reference to FIG. 9.

The second embodiment comprises a control circuit 37 for continuously supplying an operation power (Vcc) to the LAN controller 31 when the second power supply control signal (WOLEN) is active upon turning off the power supply of the PC main body 100, or in an end process upon undocking the PC main body 100, while an operation power (Vcc) is supplied to the LAN controller 31.

The aforementioned two different power supply control signals (DOCPWON/WOLEN) are input to the control circuit 37 in the LAN docker 200.

The control circuit 37 outputs a power ON/OFF instruction signal to the power supply circuit 33 in 49 accordance with these two different power supply control signals (DOCPWON/WOLEN).

In this case, when the first power supply control signal (DOCPWON) instructs power ON, the control circuit 37 outputs a power ON instruction signal (PW-ON) to the power supply circuit 33; when the first power supply control signal (DOCPWON) instructs power OFF and the second power supply control signal (WOLEN) is inactive, it outputs a power OFF instruction signal (PW-OFF) to the power supply circuit 33. On the other hand, when the first power supply control signal (DOCPWON) instructs power OFF and the second power supply control signal is active, the control circuit 37 maintains the power ON instruction state, ignoring the power off instruction of the first power supply control signal (DOCPWON).

In this manner, the control circuit 37 continuously supplies an operation power (LAN-PS) to the LAN controller 31 when the second power supply control signal (WOLEN) is active upon turning off the power supply of the PC main body 100, or in an end processing upon undocking the PC main body 100, while the operation power (LAN-PS) is supplied to the LAN controller 31.

The power supply circuit 33 supplies the operation power (LAN-PS) to the LAN controller 31 in accordance with the power ON/OFF instruction signal output from the control circuit 37. More specifically, the power supply circuit 33 continuously supplies the operation power (Vcc) to the LAN controller 31 when the second power supply control signal (WOLEN) is active upon receiving a power OFF instruction from the PC main body 100, or in an end process upon undocking the PC main body 100, while the operation power (Vcc) is supplied to the LAN controller 31. In this case, the operation power (LAN-PS) supplied to the LAN controller 31 is generated based on an external AC adapter power supply. Upon undocking the PC main body 100, user operation for unlocking a lock mechanism of the PC main body 100 docked with the LAN docker 200 is completed. The control circuit 37 checks the state of the second power supply control signal at the unlocking signal input timing. If the second power supply control signal (WOLEN) is active, the control circuit 37 maintains the power ON instruction state and continuously supplies the operation power (Vcc) to the LAN controller 31.

The operation in the embodiment of the present invention will be described below with reference to FIG. 9.

The LAN controller 31 provided to the LAN docker 200 is connected to a server (not shown) via a LAN. The power supply circuit in the LAN docker 200 receives an external AC adapter power.

When the PC main body 100 is docked to the LAN docker 200 and is locked by the lock mechanism (not shown), the PC main body 100 and LAN docker 200 are connected to each other via connectors. When the first power supply control signal (DOCPWON) for instructing power ON is supplied from the PC main body 100 to the control circuit 37 in the LAN docker 200 while the PC main body 100 is docked, the control circuit 37 outputs a power ON instruction signal (PW-ON) to the power supply circuit 33. The power supply circuit 33 supplies an operation power (Vcc) generated based on the external AC adapter power to the LAN controller 31 in response to the power ON instruction signal (PW-ON).

Upon receiving the operation power (Vcc) from the power supply circuit 33, the LAN controller 31 starts its operation and allows communications between the docked PC main body 100 and another PC (personal computer) or server via the LAN.

On the other hand, when the first power supply control signal (DOCPWON) that instructs power OFF is supplied from the PC main body 100 to the control circuit 37 in the LAN docker 200 while the PC main body 100 is docked, if the second power supply control signal (WOLEN) is inactive at that time, the control circuit 37 outputs a power OFF instruction signal (PW-OFF) to the power supply circuit 33. The power supply circuit 33 cuts off supply of the operation power (Vcc) to the LAN controller 31 in response to this power OFF instruction signal (PW-OFF).

When the first power supply control signal (DOCPWON) that instructs power OFF is supplied from the PC main body 100 to the control circuit 37 in the LAN docker 200 while the PC main body 100 is docked, if the second power supply control signal (WOLEN) is active at that time, the control circuit 37 invalidates the power OFF instruction of the first power supply control signal (DOCPWON), i.e., does not output any power OFF instruction signal (PW-OFF), and holds the power ON instruction state. Hence, the power supply control circuit 33 continuously supplies the operation power (Vcc) to the LAN controller 31.

In this case, since the LAN controller 31 continuously maintains the operative state while the PC main body 100 is docked, the WOL function that resumes the PC main body 100 from the stop or sleep state upon receiving a specific packet from the network is enabled.

When the PC main body 100 is undocked while the operation power (Vcc) is supplied to the LAN controller 31, the control circuit 37 checks the state of the second power supply control signal (WOLEN) at the unlocking signal input timing. If the second power supply control signal (WOLEN) is active, the control circuit 37 similarly maintains the power ON instruction state. Hence, the power supply control circuit 33 continuously supplies the operation power (Vcc) to the LAN controller 31.

In this case, since the LAN controller 31 continuously maintains the operative state while the PC main body 100 is undocked, the AOL function that automatically informs the server side of abnormality, status change, and the like via the network is enabled.

Or when a Heart_beat function that informs the server side of the connection state at given periods via the network is provided to the LAN controller 31 of the LAN docker 200, that function is enabled at that time.

Also, a received data saving mechanism that implements a received data storage function may be provided to the LAN controller 31 of the LAN docker 200, and a power may be supplied to the received data saving mechanism in synchronism with the LAN docker 200, thus implementing a mailbox type data storage function.

As described above, the control circuit 37 maintains supply of the operation power (Vcc) to the LAN controller 31 when the second power supply control signal (WOLEN) is active upon turning off the power supply of the PC main body 100, or in an end process upon undocking the PC main body 100, while an operation power (Vcc) is supplied to the LAN controller 31. In this manner, a network system with the WOL and AOL functions can be easily constructed in a computer system using an expansion unit.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer system removably dockable with an expansion unit, comprising:
   state detecting means for detecting whether a state of the expansion unit is an enable state in which the expansion unit can be used by the computer system; and lock control means for locking, during the enable state, the computer system in the expansion unit in order to inhibit the computer system from being removed from the expansion unit, wherein the state detecting means comprises docking condition detecting means for detecting whether the computer system docked with the expansion unit satisfies a predetermined docking condition for using the expansion unit;

the computer system is locked in the expansion unit while the computer system is in an operative state and satisfies the predetermined docking condition; and wherein the docking condition detecting means includes:

storing means for storing an ID of one of the computer system and the expansion unit in the other of the computer system and the expansion unit;

collation means for collating an ID of the one of the computer system and the expansion unit with the stored ID of the other of the computer system and the expansion unit; and means for detecting whether the predetermined docking condition is satisfied based on an output of the collation means.

2. The system according to claim 1, wherein the expansion unit includes a lock mechanism for locking, in the expansion unit, the computer system docked to the expansion unit; and wherein the lock control means includes:

means for generating a first power supply control signal for directing power to the expansion unit in response to a transition of the computer system into an operative state; and means for ceasing generation of the first power supply control signal in response to at least one of a transition of the computer system from the operative state to a non-operative state and a determination by the docking condition detecting means that the predetermined docking condition is not satisfied; and wherein the lock control means controls the lock mechanism to lock the computer system to the expansion unit based on the first power supply control signal.

3. The system according to claim 1, wherein the expansion unit includes a network control unit for connecting the computer system docked to the expansion unit to a network; and the system further comprising:

means for generating a first power supply control signal for directing power to the network control unit; and means for generating a second power supply control signal for maintaining power to the network control unit after a state of the computer system changes from the operative state to a stop state or a sleep state; and wherein the lock control means releases lock of the computer system to the expansion unit when the first power supply control signal is not generated and the second power supply control signal is generated.

4. The system according to claim 1 wherein the expansion unit includes a network control unit for connecting the computer system docked to the expansion unit to a network; and the system further comprising:

means for generating a first power supply control signal for directing power to the network control unit in response to a transition of the computer system into an operative state;

means for generating a second power supply control signal for maintaining power to the network control unit after a transition of the computer system from the operative state to one of a stop state and a sleep state; and wherein the lock control means locks the computer system to the expansion unit when the first power supply control signal is generated regardless of whether the second power supply control signal is generated.

5. The system according to claims 4, further comprising:

switching means for connecting and disconnecting a bus of the computer system and a bus of the network control unit; wherein an operation state of the network control unit includes;

a first state in which the first power supply control signal directs power to the network control unit and the switching means connects the bus of the computer system and the bus of the network control unit;

a second state in which the first power supply control signal directs power to the network control unit and the switching means disconnects the bus of the computer system and the bus of the network control unit;

a third state in which the second power supply control signal maintains power to the network control unit and the switching means disconnects the bus of the computer system and the bus of the network control unit; and a fourth state in which power is not supplied to the network control unit and the switching means disconnects the bus of the computer system and the bus of the network control unit; and wherein the lock control means releases the lock of the computer system when the operation state of the network control unit is one of the third state and the fourth state.

6. A computer system, removably dockable with an expansion unit having a network control unit, comprising;

means for generating a first power supply control signal for directing power to the network control unit;

means for generating a second power supply control signal for maintaining power to the network control unit when the computer system is in one of a stop state and a sleep state; and lock control means for locking the computer system to the expansion unit while the first power supply control signal is generated regardless of whether the second power supply control signal is generated.

7. The system according to claim 6, wherein the lock control means unlocks the computer system from the expansion unit when generation of the first power supply control signal ceases and the second power supply control signal is generated.

8. The system according to claim 6, further comprising:

switching means for connecting and disconnecting a bus of the computer system and a bus of the network control unit, wherein an operation state of the network control unit includes:

a first state in which the first power supply control signal directs power to the network control unit and the switching means connects the bus of the computer system and the bus of the network control unit;

a second state in which the first power supply control signal directs power to the network control unit and the switching means disconnects the bus of the computer system and the bus of the network control unit;

a third state in which the second power supply control signal maintains power to the network control unit and the switching means disconnects the bus of the computer system and the bus of the network control unit; and a fourth state in which power is not supplied to the network control unit and the switching means disconnects the bus of the computer system and the bus of the network control unit; and wherein the lock control means releases the lock of the computer system when the operation state of the network control unit is one of the third state and the fourth state.

9. A computer system removably dockable with an expansion unit having a network control unit, comprising:

a controller configured to generate a first power supply control signal for directing power to the network control unit and a second power supply control signal for maintaining power to the network control unit if the computer system is in one of a stop state and a sleep state; and a lock mechanism configured to lock the computer system to the expansion unit while the first power supply control signal is generated regardless whether the second power supply control signal is generated.

10. The system according to claim 9, wherein the lock mechanism unlocks the computer system from the expansion unit when generation of the first power supply control signal ceases and the second power supply control signal is generated.

11. The system according to claim 9, further comprising:

a switch for connecting and disconnecting a bus of the computer system and a bus of the network control unit; wherein an operation state of the network control unit includes:

a first state in which the first power supply control signal directs power to the network control unit and the switch connects the bus of the computer system and the bus of the network control unit;

a second state in which the first power supply control signal directs power to the network control unit and the switch disconnects the bus of the computer system and the bus of the network control unit;

a third state in which the second power supply control signal maintains power to the network control unit and the switch disconnects the bus of the computer system and the bus of the network control unit; and a fourth state in which power is not supplied to the network control unit and the switch disconnects the bus of the computer system and the bus of the network control unit; and wherein the lock control means releases the lock of the computer system when the operation state of the network control unit is one of the third state and the fourth state.

12. A method for removably docking a computer system with an expansion unit, comprising the steps of:

detecting whether a state of the expansion unit is an enable state in which the expansion unit can be used by the computer system;

locking, during the enable state, the computer system to the expansion unit in order to inhibit the computer system from being removed from the expansion unit;

storing an ID of one of the computer system and the expansion unit in the other of the computer system and the expansion unit;

collating an ID of the one of the computer system and the expansion unit with the stored ID of the other of the computer system and the expansion unit; and detecting whether the predetermined docking condition for using the expansion unit is satisfied based on an output of the collating step;

and wherein the computer system is locked in the expansion unit while the computer system is in an operative state and satisfies the predetermined docking condition.

13. The method according to claim 12, wherein the expansion unit includes a lock mechanism for locking, in the expansion unit, the computer system docked to the expansion unit, the method further comprising:

generating a first power supply control signal for directing power to the expansion unit in response to a transition of the computer system into an operative state;

ceasing generation of the first power supply control signal in response to at least one of a transition of the computer system from the operative state to a non-operative state and a determination by the docking condition detecting means that the predetermined docking condition is not satisfied; and locking the computer system to the expansion unit based on the first power supply control signal.

14. The method according to claim 12, wherein the expansion unit includes a network control unit for connecting the computer system docked to the expansion unit to a network, the method further comprising:

generating a first power supply control signal for directing power to the network control unit;

generating a second power supply control signal for maintaining power to the network control unit after a state of the computer system changes from the operative state to a stop state or a sleep state; and unlocking the computer system from the expansion unit when the first power supply control signal is generated and the second power supply control signal is generated.

15. The method according to claim 12, wherein the expansion unit includes a network control unit for connecting the computer system docked to the expansion unit to a network, the method further comprising:

generating a first power supply control signal for directing power to the network control unit in response to a transition of the computer system into an operative state;

generating a second power supply control signal for maintaining power to the network control unit after a transition of the computer system from the operative state to one of a stop state and a sleep state; and locking the computer system to the expansion unit when the first power supply control signal is generated regardless of whether the second power supply control signal is generated.

16. The method according to claim 15, further comprising:

entering an operation state of the network control unit chosen from a group of operation states comprising:

a first state comprising directing power to the network control unit, and connecting the bus of the computer system and the bus of the network control unit;

a second state comprising directing power to the network control unit, and disconnecting the bus of the computer system and the bus of the network control unit;

a third state comprising maintaining power to the network control unit, and disconnecting the bus of the computer system and the bus of the network control unit; and a fourth state comprising not supplying power to the network control unit, and disconnecting the bus of the computer system and the bus of the network control unit; and unlocking the computer system from the network control unit when the operation state of the network control unit is one of the third state and the fourth state.

17. A method for removably docking a computer system with an expansion unit having a network control unit, comprising the steps of:

generating a first power supply control signal for directing power to the network control unit;

generating a second power supply control signal for maintaining power to the network control unit when the computer system is in one of a stop state and a sleep state; and locking the computer system to the expansion unit while the first power supply control signal is generated regardless of whether the second power supply control signal is generated.

18. The method according to claim 17, further comprising:

unlocking the computer system from the expansion unit when generation of the first power supply control signal ceases and the second power supply control signal is generated.

19. The method according to claim 17, further comprising:

entering an operation state of the network control unit chosen from a group of operation states comprising:

a first state comprising directing power to the network control unit, and connecting the bus of the computer system and the bus of the network control unit;

a second state comprising directing power to the network control unit, and disconnecting the bus of the computer system and the bus of the network control unit;

a third state comprising maintaining power to the network control unit, and disconnecting the bus of the computer system and the bus of the network control unit; and a fourth state comprising not supplying power to the network control unit, and disconnecting the bus of the computer system and the bus of the network control unit; and unlocking the computer system from the network control unit when the operation state of the network control unit is one of the third state and the fourth state.

* * * * *

UNITED STATES PATENT AND TRADEMARK OFFICE
CERTIFICATE OF CORRECTION

PATENT NO. : 6,425,040 B1
DATED : July 23, 2002
INVENTOR(S) : Dewa et al.

It is certified that error appears in the above-identified patent and that said Letters Patent is hereby corrected as shown below:

Column 16,
Line 10, change "claims 4," to -- claim 4, --.

Signed and Sealed this

Twenty-fifth Day of March, 2003

JAMES E. ROGAN
*Director of the United States Patent and Trademark Office*